United States Patent [19]

Maruyama et al.

[11] 4,392,168
[45] Jul. 5, 1983

[54] ROTARY HEAD ASSEMBLY

[75] Inventors: Teruo Maruyama, Neyagawa; Takashi Ichiyanagi, Hirakata; Ichizo Otoda, Ikeda, all of Japan

[73] Assignee: Matsushita Electric Industrial Co., Ltd., Osaka, Japan

[21] Appl. No.: 263,579

[22] Filed: May 14, 1981

Related U.S. Application Data

[63] Continuation of Ser. No. 66,438, Aug. 14, 1979, abandoned.

[30] Foreign Application Priority Data

Aug. 16, 1978 [JP] Japan .................................. 53-100300

[51] Int. Cl.³ .......................... G11B 5/10; G11B 21/18
[52] U.S. Cl. ................................. 360/129; 360/130.24
[58] Field of Search .............. 360/129, 130.24; 308/9, 308/10, 78, 107, 108

[56] References Cited

U.S. PATENT DOCUMENTS

| | | | |
|---|---|---|---|
| 3,602,555 | 8/1971 | Hendler | 308/9 |
| 3,877,761 | 4/1975 | Boden et al. | 308/10 |
| 3,890,019 | 6/1975 | Boden et al. | 308/10 |
| 3,918,773 | 11/1975 | Tuffia | 308/9 X |
| 3,998,502 | 12/1976 | Walter et al. | 308/9 |
| 4,043,612 | 8/1977 | Orcutt | 308/9 |
| 4,065,279 | 12/1977 | McCullough | 308/9 X |

FOREIGN PATENT DOCUMENTS 2903197 2/1979 Fed. Rep. of Germany ...... 360/129

Primary Examiner—Aristotelis M. Psitos
Attorney, Agent, or Firm—Burgess, Ryan and Wayne

[57] ABSTRACT

A rotary head assembly having a central stationary shaft one end of which is securely joined to a lower housing, a bearing spacer securely fitted over the stationary shaft at the other end thereof and a rotary sleeve disposed for rotation about the common axis of the stationary shaft and the bearing spacer, whereby a hydraulic bearing is defined by the bearing spacer, the rotary sleeve and a lubricant filled into the space between the bearing spacer and the rotary sleeve, and a hydraulic passage is defined between the stationary shaft and the rotary sleeve. The lower end of the lubricant passage is provided with a magnetic sealing means which seals a magnetic liquid so as to prevent the leakage to the exterior of the magnetic liquid or the lubricant. An upper cylinder which carries one or more video signal recording and reproducing heads is removably mounted on the rotary sleeve.

11 Claims, 11 Drawing Figures

ROTARY HEAD ASSEMBLY

This is a continuation of application Ser. No. 66,438, filed Aug. 14, 1979 and now abandoned.

BACKGROUND OF THE INVENTION

The present invention relates to a rotary head assembly and more particularly a lubrication system for bearing means of a rotary head of a video tape recorder to be referred to as "VTR" in this specification for brevity.

The rotary head assembly for VTR must satisfy the following requirements among other things:

(1) The desired rotational speed of the upper head carrying the video signal recording and reproducing heads must be maintained with a high degree of accuracy.

(2) Lateral vibration and/or rocking of the axis of rotation of the upper head must be minimized.

The recent tendency of VTR is towards recording at a higher density and more compactness, so that the recording time may be increased and the operation of the portable VTR may be facilitated.

The above requirements cannot be met by the conventional rotary head assembly wherein the rotary shaft carrying the upper cylinder which in turn carries video signal recording and reproducing heads is supported by rolling-contact bearings which are spaced apart from each other. For instance, the accuracy of rotation is adversely affected by the poor running accuracy of the rolling contact bearings, the vibrations caused by the elasticity of their inner and outer races, plays between the component parts and so on.

Instead of rolling contact bearings, oilless bearings have been also used, but they are the so-called boundary lubrication bearings so that excessive play between the bearings and journals results in variations or inaccuracy in rotational speed.

In order to overcome the above and other problems, hydraulic bearings have also been used, but they have some problems to be described below.

(1) It is difficult to design and construct a rotary head assembly which is compact in size and may be fabricated at low cost.

Prerequisites for home electronic equipment such as VTR are compactness and mass production at low cost. The rotary head assemblies for industrial VTR's incorporating the static pneumatic bearings have been long produced, but they are not adapted to be incorporated into home VTR because a compressor, which is a compressed air source, and a complex pneumatic control circuit must be included. The dynamic pneumatic bearings need no compressor, but their effects (high pressure and rigidity) are attained only at extremely high rotational speeds of the order of 1800–3600 rpm so that they cannot be used in home VTR's.

(2) When an oil is used as a lubricant, it becomes extremely difficult to seal or contain it for a long time.

While the lubricant for machine tools may be replaced or supplemented at any time, the oil for the hydraulic bearing of the VTR rotary head assembly must be completely sealed so that no supplement will be needed. When the oil leaks, the lubrication effects (rigidity and load capacity) of the hydraulic bearing are degraded so that the rotational speed varies. Furthermore the leakage of the lubricating oil will adversely affect the operation of VTR. When the leaked lubricating oil attaches to the heads and consequently to the tape, the dust is easily accumulated so that the correct recording and reproduction will become impossible due to dropout error. That is, the FM carrier is partially lost, resulting in dropouts.

There have been used (a) contact type seals and (b) non-contact type seals so as to prevent the leakage of lubricating oil. For instance, oil seals, O-rings, mechanical seals and so on belong to the contact type seals. They are directly fitted over the rotary shafts and exert the pressure of contact to them so that they place a considerable load on them. As a result, the highly precise rotational functions (the uniform torque and uniform thickness of oil film) of the hydraulic bearing cannot be attained. The rotary head assembly of VTR is driven by a small, low-torque direct drive motor (to be referred to as "DD motor" in this specification), and the variations in rotational speed must be less than 0.002%. Therefore a load placed on the rotary shaft must be as lowest as possible. Thus the application of the contact type seals to the rotary head assembly of VTR is difficult.

The non-contact type seals utilize the centrifugal force exerted to a liquid or the pumping action of a viscous liquid as in the case of the visco seals. During the rotation, no leakage occurs, but when the rotary shaft stops the oil leakage problem arises.

In addition to the contact and noncontact type seals, the magnetic seal utilizing a magnetic liquid has been also used to prevent the leakage of a lubricant. For instance, U.S. Pat. No. 4,043,612 discloses a hydraulic bearing for industrial VTR's which employs a magnetic liquid as a lubricant, but this hydraulic bearing is not adapted for use in the rotary head assembly for a home VTR.

SUMMARY OF THE INVENTION

Accordingly, the primary object of the present invention is to eliminate the above and other problems encountered in the prior art rotary head assembly of a VTR.

In a VTR rotary head assembly in accordance with the present invention, a bearing spacer is fitted over one end of a central stationary shaft the other end of which is securely held, and a hydraulic bearing is defined between the bearing spacer and the cylindrical bore wall of a rotary sleeve which rotates about the bearing spacer. An upper cylinder carrying heads is removably mounted on the rotary sleeve. A lubricant passage is defined between the stationary shaft and the rotary sleeve, and the lower end of the lubricant passage; that is, the lower end of the rotary sleeve is provided with a magnetic seal which seals a magnetic lubricant liquid, thereby preventing the leakage to the exterior of a lubricanting oil or liquid contained in the hydraulic bearing.

The present invention will become more apparent from the following description of some preferred embodiments thereof taken in conjunction with the accompanying drawings.

BRIEF DESCRIPTION OF THE DRAWINGS

Same reference numerals are used to designate similar parts from FIG. 4 to FIG. 11.

DESCRIPTION OF THE PRIOR ART BEARINGS FOR VTR

Figure 1:
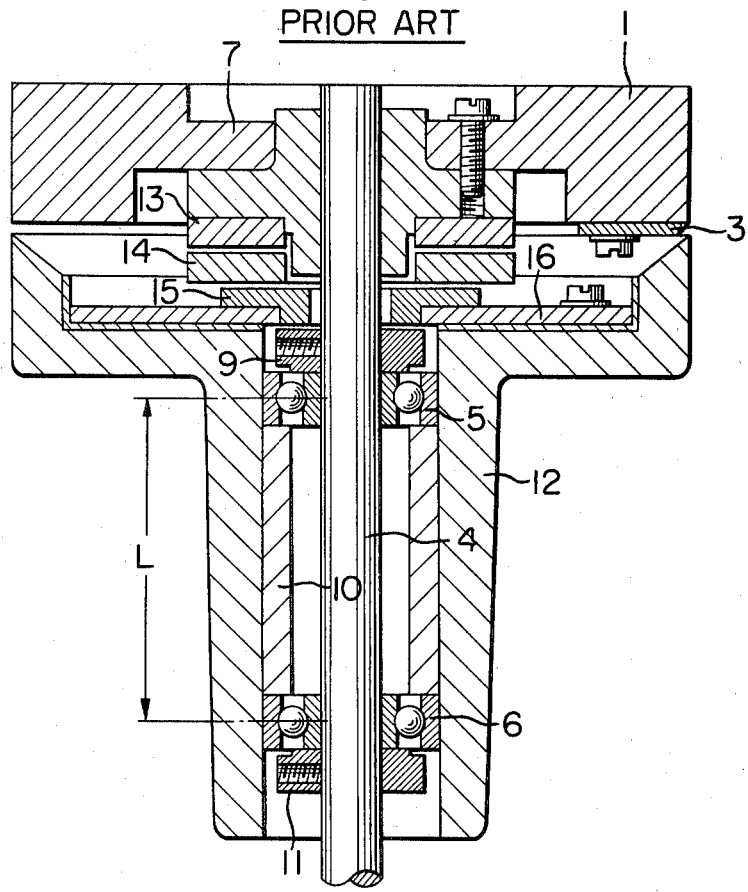
FIG. 1 is a longitudinal sectional view of a prior art VTR rotary head assembly.

Referring to FIG. 1, the reference numeral 1 denotes a rotary cylinder (an upper cylinder) which is driven at 1800 rpm in case of the two-head helical scan type VTR. 3 is a head mounted on the rotary cylinder 1. 4 is a rotary shaft which is supported by radial and thrust bearings 5 and 6. 7 is a bushing mounted on the rotary shaft 4 and securely attached to the rotary cylinder 1. 9, 10 and 11 are sleeves. The sleeves 9 and 11 are so mounted on the rotary shaft 4 as to press against the bearings 5 and 6, respectively, whereby displacement of the bearings 5 and 6 in the axial direction may be eliminated. 12 is a housing which is a casing for housing the bearings 5 and 6. The rotary head 1 is so mounted to the bushing 7 that in the case of the replacement of the head 3 due to the wear thereof the rotary cylinder 1 may be removed upwardly from the bushing 7. 13 is a rotary transformer which is rotated in unison with the rotary cylinder 1 while 14 is a rotary transformer which is held stationary.

Figure 2:
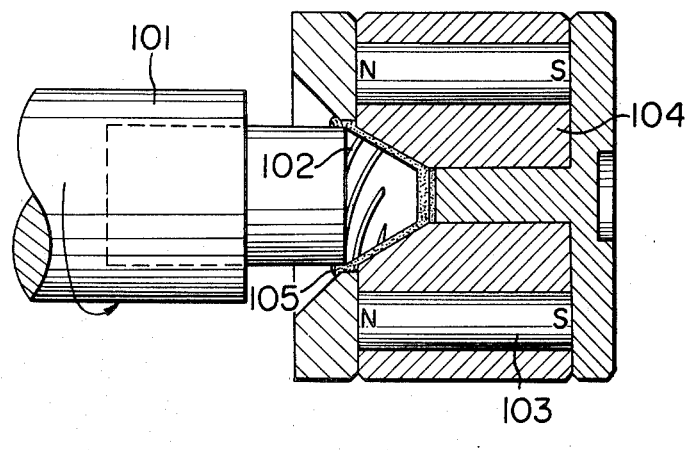
FIG. 2 is a side view, partly in section, of a hydraulic bearing and a magnetic seal for a rotary head assembly of an industrial VTR.
Figure 3:
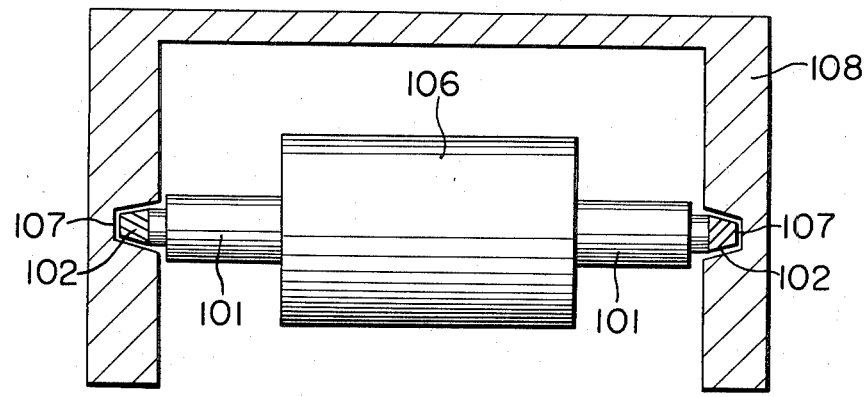
FIG. 3 is a side view of the rotary head assembly incorporating the hydraulic bearing and magnetic seal shown in FIG. 2.

FIG. 2 shows a bearing disclosed in U.S. Pat. No. 4,043,612. 101 is a rotary shaft; 102, a spiral groove formed on the conical end of the rotary shaft 101; 103, a permanent magnet; and 104 is a housing which houses the permanent magnets 103 and is adapted to receive the conical end with the spiral groove 102 of the rotary shaft 101 through a magnetic liquid 105. The magnetic liquid 105 is trapped by the magnetic flux flowing in the vicinity of the opening of the spiral groove 102. The spiral groove 102 functions as a thrust bearing which forces the lubricant 105 into the housing 104. VTR has a construction as shown in FIG. 3. The rotary shaft 101 carries a drum 106, and the spiral thrust bearings 107 on both ends of the rotary shaft 101 take both the radial and thrust loads. The bearing of the type described above is adapted for use in industrial VTR especially of vertical type, but is not adapted for helical scan type home VTR wherein an upper cylinder must be removed upwardly in a simple manner for replacement of worn out heads.

The housings 108, which receive the ends of the rotary shaft 101, must be vertically disposed (See FIG. 1) so that it will become very difficult to design and construct portable home VTR which is compact.

The magnetic liquid, which is sealed between the thrust bearing and the housing for the thrust bearing is small in quantity so that the problem of the loss of the magnetic liquid due to its vaporization arises as described elsewhere.

While the industrial VTR is installed in a temperature controlled room, the home VTR is used at various temperatures. The loss due to vaporization is high especially when the home VTR is left at high temperatures. The degree of vaporization of a magnetic liquid is dependent upon the kind and viscosity of a base oil.

In general, the lower the viscosity, the lower the saturated vapor pressure becomes and consequently the higher the degree of vaporization becomes.

In the case of the industrial VTR of the type described, the use of a synthetic oil with the high viscosity [of the order of 75 cm-poise (cP)] may reduce the volatality. In the case of the home VTR (especially the portable home VTR with a battery), the following requirements must be satisfied.

(i) The load torque must be low, and (ii) The temperature dependence of the load torque must be less. When a lubricant with a low viscosity is used in order to satisfy the requirement (i), the problem of the loss due to the vaporization of the lubricant results. In general, the higher the viscosity, the more the variation of viscosity with temperature (VI value) becomes.

The viscosity varies exponentially with temperature. As a result, a low torque cannot be attained merely by the design and construction of bearings. Therefore there is a contradiction between the attempts for attaining a low torque of a cylinder and for sealing a lubricant for a long time.

PREFERRED EMBODIMENTS OF THE INVENTION

Figure 4:
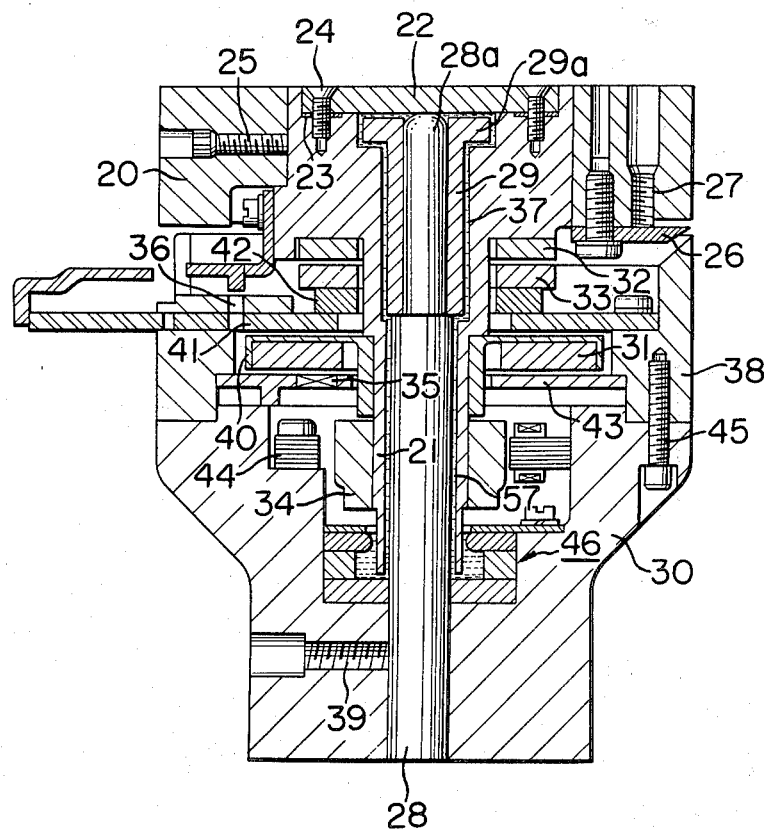
FIG. 4 is a longitudinal sectional view of a rotary head assembly of VTR of a first embodiment of the present invention.

FIG. 4 shows a cylinder of a VTR in accordance with the present invention. Reference numeral 20 designates an upper cylinder around which is wrapped a magnetic tape; 21, a rotary sleeve; 22, a cap for the upper cylinder 20; 23, an oil seal; 24, bolts. Both the upper cylinder 20 and the rotary sleeve 21 are so tapered that the upper cylinder 20 may be removed from the rotary sleeve 21. They are joined together with bolts 25. The rotary sleeve 21 and the cap 22 form a housing for a rotating member of a hydraulic bearing.

The oil seal 23 is disposed in order to prevent the leakage of a lubricant to be described below. The bolts 24 are used to join the cap 22 to the rotary sleeve 21 through the oil seal 23. 26 designates a head which is mounted on the upper cylinder 20. The fine adjustments of azimuth, zenith and parallelism may be made by the adjusting screw 27 for aligning the head 26. 28 designates a central stationary shaft; and 29, a hydraulic bearing spacer which carries both the thrust and radial loads and is made of phosphor bronze (PBB1). The surface of the spacer 29 is etched to form a spiral groove.

The central stationary shaft 28 is made of an alloy tool steel and has a pivot bearing 28a at the upper end. The cap 22 is made of a high carbon chromimum steel (SUJ). The rotary sleeve 21 is made of a hard aluminum (Al-P$_3$-H) in order to reduce the weight of the rotating member (that is, to attain a low inertia). 30 designates a lower housing and has a function of a base for supporting the central stationary shaft 28. 31 designates an armature magnet of a DC motor; 32, a rotary transformer for detecting the signal from the head 26; 33, a rotary transformer which is held stationary; 34, a position rotor; 35, a stator coil; 36, a pulse generator coil; 37, a lubricant space of the hydraulic bearing; 38, a lower cylinder; and 39, a setscrew for retaining the central stationary shaft 28 in position.

The term "the lubricant or lubrication space" is used in this specification to refer to the space where sufficiently large wedge shaped oil films may be formed due to the eccentricy of the bearing. More particularly, it designates the narrow space surrounding the cylindrical surface with the spiral groove of the spacer 29 and around the upper, lower and peripheral surfaces of the flange 29a which serves as a thrust bearing.

The armature magnet 31 is housed within a magnet case 40 which in turn is pressure fitted over the rotary sleeve 21. The rotary transformer 32 is bonded to the rotary sleeve 21 with an adhesive while the rotary transformer 33 is bonded with an adhesive to a mounting ring 42 which in turn is mounted on a mounting plate 41. 43 designates a coil mounting plate; and 44, a position stator. The position stator 44 and the position rotor 34 correspond to a brush of a general DC motor and detect the angular position of a rotor which is the armature magnet 31 of the DD motor in this embodiment. The lower cylinder 38 is joined to the lower housing 30 with bolts 45. 46 designates a magnetic seal assembly.

Figure 5:
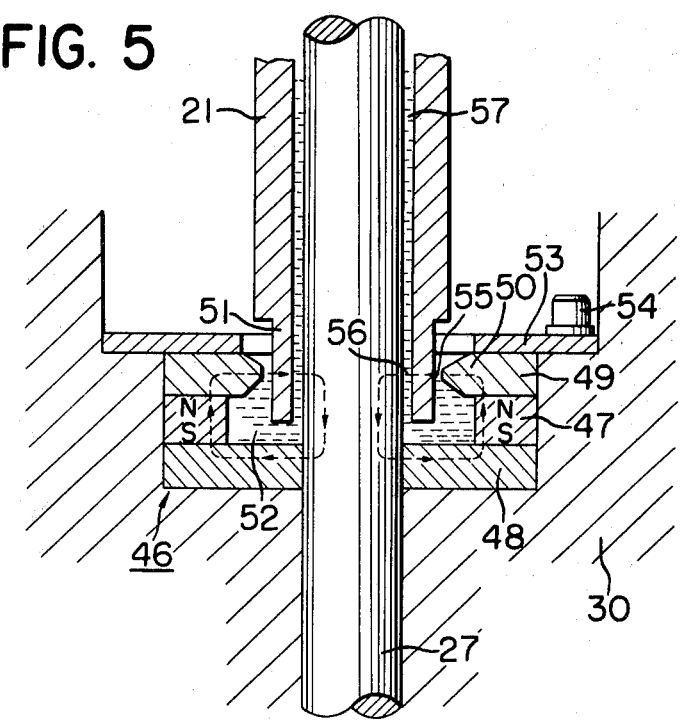
FIG. 5 is a fragmentary sectional view, on enlarged scale, thereof.

FIG. 5 is a view, on enlarged scale, illustrating in detail the magnetic seal assemly 46. 47 designates a permanent magnet; 48, a yoke (A); 49, a yoke (B); 50, a radially inwardly extended tapered edge; 51, the reduced diameter portion of the rotary sleeve 21; 52, a lubricant tank or reservoir; and 53, a magnetic shielding plate made of Permalloy and joined with bolts 54 to the lower housing 30 so that the magnetic seal assembly 46 may be securely held in position. The yokes 48 and 49 are made of a cold-rolled sheet steel, which is most frequently used for the fabrication of yokes for loudspeakers or the like. 55 designates a space (A); and 56, a space (B). The space (A) 55 is an opening of the hydraulic bearing in accordance with the present invention. The space (A) 55 is a gap between the reduced diameter portion 51 of the rotary sleeve 21 and the yoke 49, and the space (B) 56 is a gap between the reduced diameter portion 51 of the rotary sleeve 21 and the central stationary shaft 27.

A magnetic lubricant 57 is contained in the lubrication space 37 (See FIG. 4) around the spacer 29 and in the space between the rotary sleeve 21 and the central stationary shaft 28. The lubricant tank 52 is the so-called "reservoir" of the magnetic lubricant 57.

The magnetic lubricant 57 has not only the flowability which is the inherent property of a liquid but also the magnetic properties exhibited by an alloy (a solid) of iron, nickel, ferrite and so on.

According to the present invention, magnetite (FeO Fe$_2$O$_3$), which is one of the ferrites, is formed into particles of the diameter of about 100 Å and is dispersed into a solvent with the aid of a surface active agent, whereby the magnetic liquid (15 cst) of the di-ester base is prepared.

In the cylinder shown in FIG. 4, the magnetic lubricant 57 is contained in the lubrication space 37, the space between the rotary sleeve 21 and the stationary shaft 27 and the lubricant tank 52. The magnetic lubricant 57 exhibits lubrication effects similar to oil.

In general, the magnetic lubricant 57 has a viscosity twice as high as that of a base oil and exhibits a variation of viscosity with temperature almost the same as the base oil.

The cylinder shown in FIG. 4 is such that the rotary sleeve 21 rotates about the central stationary shaft 28 whose one end is joined to the base. A hydraulic bearing is formed between the central stationary shaft 28 and the rotary sleeve 21. The lower open end of the rotary sleeve 21 is positioned in the magnetic seal assembly 46 which is provided in order to prevent the leakage of the magnetic lubricant 57. Therefore the following advantages may be obtained:

(1) Excellent capability of sealing the lubricant for a long time may be ensured.

This advantage is obtained because the rotary sleeve 21 has only one opening which is sealed by the magnetic sealing assembly. More particularly, excellent sealing capability is attained because of the following reasons:

(a) The magnetic sealing with a long hydraulic 500 may be provided.

One of the novel features of the present invention resides in the fact that a long lubricant 500 may be provided between the space (A) 55 and the lubrication space 37 where the pressure is generated.

Even when a higher oil film pressure is generated in the lubrication space 37 because of the flow resistance between the central stationary shaft 28 and the rotary sleeve 21 and the surface tension, satisfactory sealing effects may be attained with the magnets 47 which are very small in size.

Furthermore, the open end or the space (A) 55 is far from the lubrication space 37 so that even when the magnetic lubricant 57 evaporates more or less in the vicinity of the open end, the lubrication in the lubrication space 37, in which the most optimum lubrication must be effected, will not be adversely affected. The ease with which the magnetic lubricant 57 is contained in the cylinder in accordance with the present invention may be understood by analogy with the ink contained in a fountain pen.

(b) The magnetic sealing is provided at the portion which is sufficiently cooled. In general, the upper limit temperature of the magnetic lubricant 57 is between 65° C. and 75° C. At a temperature higher than the upper limit, the desorption of the surface active agent results so that the effects (for preventing the sedimentation, separation, aggregation and the like of the fine particles by the application of the magnetic field) of the magnetic lubricant will be lost. However, in the case of the cylinder of the type shown in FIG. 4, the magnetic sealing assembly is positioned sufficiently far from the lubrication space which is at the highest temperature because of the generation of heat by friction. Furthermore the magnetic sealing assembly is made into contact with the surrounding atmosphere or the lower housing 30 which functions as a heat sink. Thus the temperature rise of the magnetic lubricant will not arise any serious problems.

(c) The lubricant (magnetic lubricant 57) may be contained in a sufficient quantity.

For instance, the lower housing 30 may be used to provide the lubrication tank 52 which is compact in size. As a result, even when the base oil, which is the solvent of the magnetic lubricant, is evaporated after a long service, it may be immediately supplemented with the magnetic lubricant in the tank 52.

The magnetic lubricant may be contained in a sufficient quantity in the passage from the lubrication space 37 to the open end 55 when the passage has a sufficient cross section.

Because of the reasons (a) through (c), the present invention may ensure the excellent sealing of the magnetic lubricant for a very long service time.

When the rotary head assembly of the present invention is incorporated into the portable VTR, the position of the cylinder varies from time to time, opposed to the console type VTR which is held stationary. When the portable VTR is carried around, external impacts are exerted to it very often so that the lubricant tends to be scattered. However, the present invention may eliminate this problem.

(2) Accurate rotation:

Loss of lubricant results in the breakdown of the oil film so that the air is entrained, adversely affecting the accurate rotation.

According to the present invention, the loss of the magnetic lubricant may be minimized or substantially eliminated so that the hydraulic bearing which offers an ideal lubrication may be provided.

(3) The rotary head assembly in accordance with the present invention may be fabricated at low cost and may be made compact in size.

In the case of the cylinder shown in FIG. 1, the distance L between the upper and lower rolling-contact bearings 5 and 6 must be greater in order to provide the rigidness sufficient to encounter the radial loads exerted to the upper cylinder 1.

According to the present invention, the interior of the upper cylinder 20 may be effectively utilized to provide the hydraulic bearing as shown in FIG. 4 so that the overall length of the cylinder may be shortened by the distance L.

Furthermore the magnetic sealing assembly 46 is disposed within the lower housing 30 adjacent to the lower open end of the rotating sleeve 21 without causing any adverse effects on the arrangements of other component parts such as the armature 31, the position rotor 34 and the stator 44. As a result, the rotary head assembly may be made compact in size.

Moreover the magnetic sealing assembly 46 comprises a minimum number of component parts so that the assembly may be much facilitated at low cost.

(4) Adverse effects from the external magnetic fields may be minimized.

As described elsewhere the magnetic sealing assembly 46 has the permanent magnets 48 which cooperate with the yokes 48 and 49 to establish the magnetic circuit which traps the magnetic lubricant 57. A considerable leakage flux occurs in the magnetic circuit of the type described and adversely affects the function of the rotary head assembly which handles the weak signals which are readily adversely affected by the external magnetic flux disturbance if an inadequate magnetic sealing is applied to the hydraulic bearing as will be described in detail below.

When the rotating members (the upper cylinder 20 and the rotary sleeve 21) are supported by the hydraulic bearing and the magnetic sealing is provided so as to prevent the leakage of the lubricant, the following problems will inevitably appear.

(i) The video signal is transmitted to or from the head 26 through the rotary transformer having no contact. The video signal is very weak (less than 1 mV) so that the noise is induced in the signal immediately by the external disturbance from the magnetic sealing.

(ii) The magnetic flux which leaks through the shaft will magnetize the rotary cylinder (made of aluminum), which is paramagnetic, so that the video signal on the tape in contact with the rotary cylinder will be erased.

Especially in the case of the reproduction at a low speed, the tape transportation speed is reduced and consequently the time of contact between the rotary cylinder and the tape is increased. Thus the leakage flux must be encountered.

The present invention may substantially eliminate the adverse effects due to the leakage flux because of the reasons to be described below.

According to the present invention, only one magnetic sealing assembly 46 is positioned adjacent to the lower open end of the rotary sleeve 21 and spaced apart from the rotary transformers 32 and 33 by a sufficiently long distance.

Furthermore the upper end 28a of the central stationary shaft 28 is spaced apart from the magnetic sealing assembly 46 by a long distance so that it is magnetically almost neutralized and consequently will not adversely affect the upper cylinder 20.

(5) Low-torque drive.

The rotary head assembly of the present invention has the excellent capability of containing the lubricant so that the increase in volatility due to the decrease in viscosity of the lubricant may be sufficiently compensated.

The magnetic lubricant may be contained in such a quantity that the evaporation loss will not give rise to a serious problem. As a result, the use of the magnetic lubricant whose base oil is for instance a synthetic lubricant such as diester with a low viscosity may be permitted. Therefore the rotary head assembly of the present invention is especially adapted for use in the portable VTR with a battery. In addition, the rotary head assembly exhibits excellent temperature load properties.

Next further embodiments of the present invention will be described.

Figure 6:
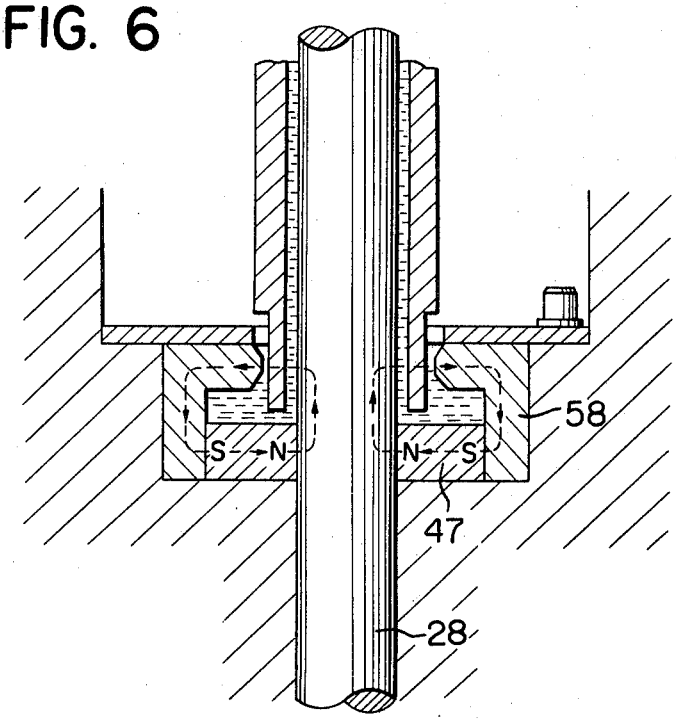
FIGS. 6 through 11 are views similar to FIG. 5, but illustrating a second through a seventh embodiment, respectively, of the present invention.

In the second embodiment shown in FIG. 6, the ring-shaped permanent magnet 47 is directly mounted on the central stationary shaft 28 without the use of the yokes. The permanent magnet 47 is radially magnetized. In the second embodiment, only one yoke 58 suffices.

Figure 7:
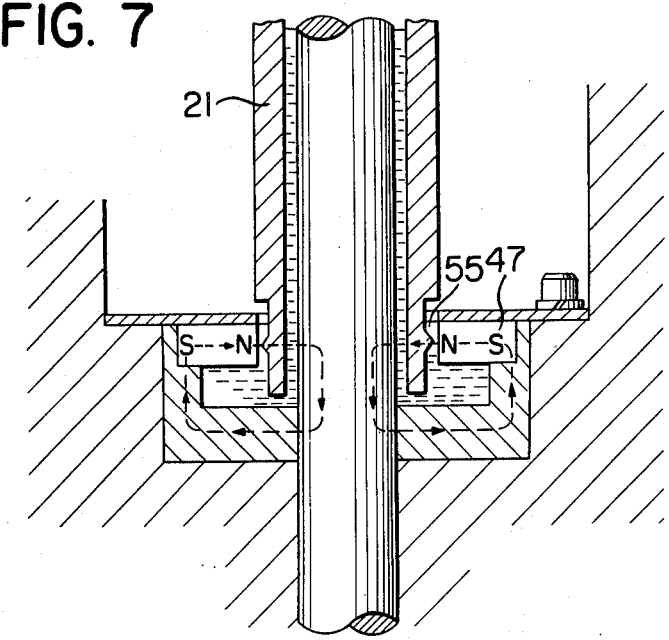

In the third embodiment shown in FIG. 7, the permanent magnet 47 is so positioned so as to directly seal the space 55. The closer the magnetic poles are located to the rotary sleeve 21, the more effective the magnetic sealing becomes. The reason is that as described elsewhere the leakage flux from the magnetic circuit shown is greater so that the far from the magnet in the gap, the weaker the magnetic flux becomes. In the third embodiment, the magnet is positioned very close to the gap where the magnetic sealing is effected.

Figure 8:
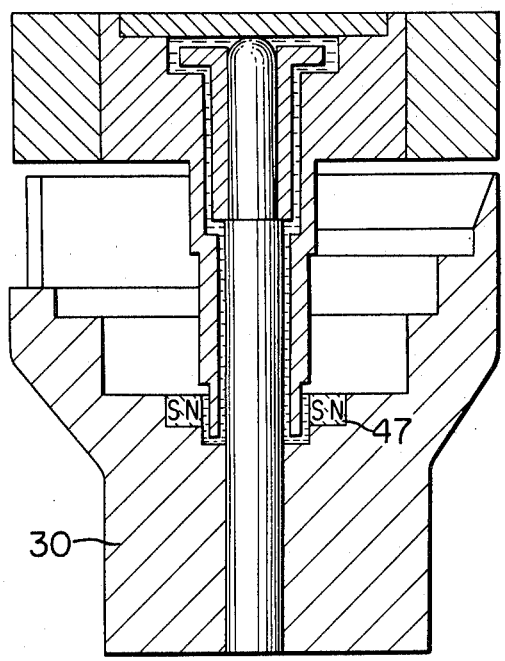

The fourth embodiment shown in FIG. 8 provides a very simple magnetic sealing. That is, the radially magnetized permanent magnet 47 is disposed within the lower housing 30.

Figure 9:
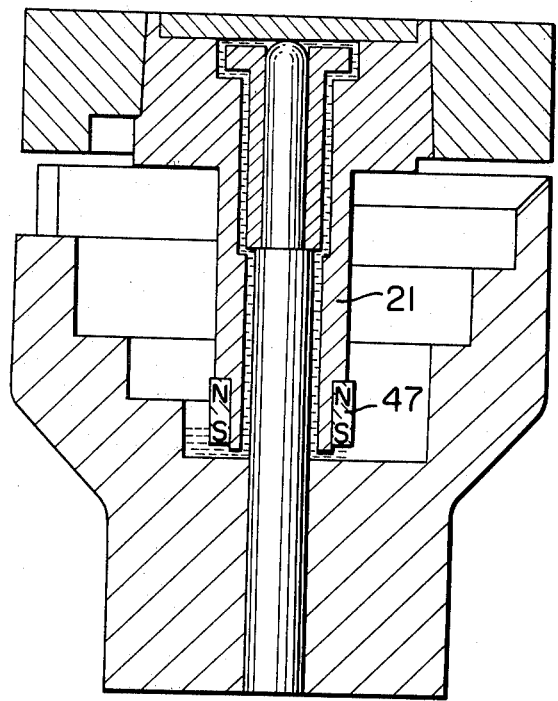

In the fifth embodiment shown in FIG. 9, the permanent magnet 47 which is radially magnetized is mounted at the lower end portion of the rotary sleeve 21.

Both the fourth and fifth embodiments eliminate the yokes so that a distinct closed magnetic circuit is not established. However, when incorporated in the desktop VTR, they may attain the satisfactory containment of the magnetic lubricant because of the following reason. The pressure produced in the lubrication space 37 is low as compared with the pressure produced in the conventional type hydraulic bearing. For instance, in the case of the desktop VTR the pressure produced in the lubrication space 37 is about 50 grams at the most which corresponds to the raidal load exerted to the tape to keep its tension.

Figure 10:
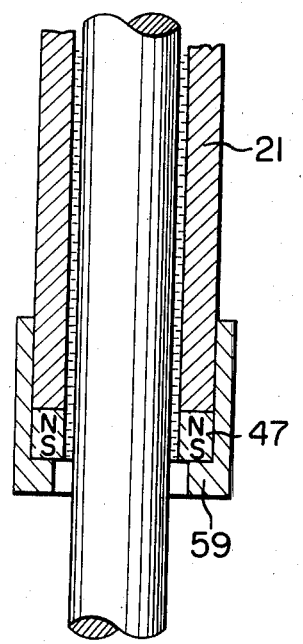

The sixth embodiment shown in FIG. 10 also provides a simple magnetic sealing. The ring-shaped permanent magnet 47 is inserted into a spacer 59 which in turn is fitted over the rotary sleeve 21 at the lower end thereof.

Figure 11:
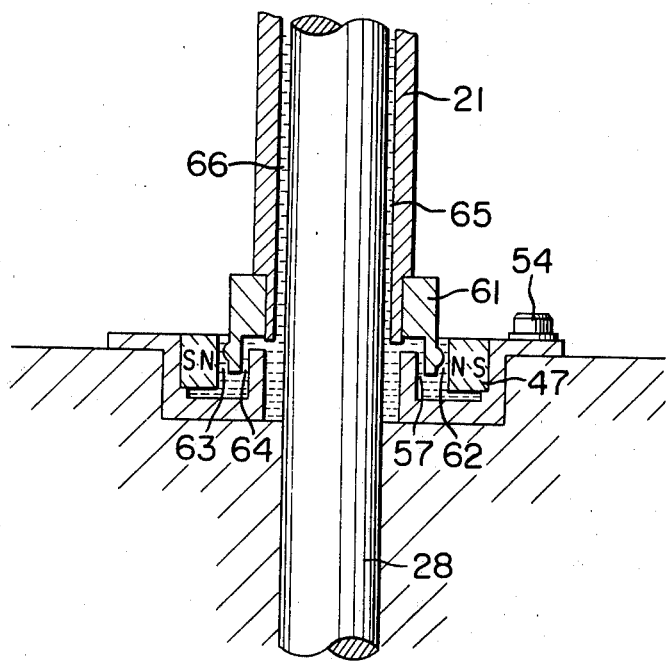

In the seventh embodiment shown in FIG. 11, the magnetic sealing assembly is fabricated as a unit and is mounted. Reference numeral 60 designates a casing; 61, a ring fitted over the reduced diameter portion at the lower end of the rotary sleeve 21; 62, a magnetic lubricant; 63, a gap (a); and 64, a gap (b). The magnetic lubricant 57 is contained in the magnetic lubricant tank 62. Both the casing 60 and the ring 61 are made of magnetic materials. The rotary sleeve 21 is made of a non-magnetic material. Therefore the magnetic lubricant 57 is trapped between the gap (a) 63 and gap (b) 64. The ring 61 is securely fitted over the rotary sleeve 21 at the lower end thereof.

When the magnetic sealing assembly is unitized as described above, the assembly of the rotary head assembly may be much facilitated.

So far the magnetic lubricant has been described as being used not only for the lubrication but also for the magnetic sealing, but it will be understood that the magnetic lubricant may be used only for the purpose of the magnetic sealing while a non-magnetic lubricant may be used for the lubrication between the spacer 29 and the rotary sleeve 21.

For instance, in the case of the unitized magnetic sealing assembly shown in FIG. 11, a non-magnetic lubricant may be contained in the passage 66 and the lubrication space 37 (See FIG. 4) above the passage 66 while a magnetic lubricant may be contained in the magnetic lubricant tank 62, the gap (a) 63 and the gap (b) 64.

In this respect the seventh embodiment is advantageous in that the filling of the non-magnetic lubricant and the filling of the magnetic lubricant may be carried out in different steps.

Furthermore the filling of the non-magnetic lubricant into the magnetic sealing assembly may be much facilitated. That is, the magnetic lubricant is filled drop by drop into the magnetic lubricant tank 62 from the above of the magnetic sealing assembly or unit.

As described elsewhere, the magnetic lubricant consists a suspension of magnetic particles. It has been used in general for sealing the pressurized gases. The present invention may use various magnetic lubricants consisting of various components. For instance, diester oil, fluoether, petroleum and the like may be used as a base liquid while magnetic particles of ferrite, magnetite and the like may be suspended in the base liquid. The compositions may be suitably varied. As described elsewhere, it is not needed to fill the lubrication space 37, the tank and the passage interconnecting them all with the magnetic lubricant. The magnetic lubricant may be used only for the purpose of attaining the magnetic sealing while a non-magnetic lubricant such as ester oil may be used for the lubrication between the rotary sleeve 21 and the spacer 29.

Throughout the figures same reference numerals are used to designate similar parts, and the explanations of the functions of similar parts have not been made.

In summary, the rotary head assembly in accordance with the present invention have the following features or advantages:

(1) The lubricant may be contained for a long time.

(2) Accurate and low-torque rotation may be ensured.

(3) The rotary head assembly may be fabricated compact in size and at low cost.

What is claimed is:

1. A rotary head assembly for a magnetic recording and reproducing device, comprising:
 (a) a central stationary shaft having one end thereof securely joined to a main body of said assembly, and another free end, said main body comprising a lower housing and a lower cylinder having a cylindrical surface coaxial with said upper cylinder;
 (b) a rotary sleeve disposed within said main body and extending into said lower cylinder for rotation about the common axis of said stationary shaft;
 (c) an upper cylinder mounted on said rotary sleeve around the periphery thereof, adjacent one end of said lower cylinder, and carrying one or more video signal magnetic recording and reproducing heads, the diameter of said upper cylinder being substantially equal to the diameter of said cylindrical surface of said lower cylinder;
 (d) a hydraulic bearing means defined by upper portions of said stationary shaft and said rotary sleeve, and a lubricant filled in the space between said upper portions of said stationary shaft and said rotary sleeve;
 (e) a lubricant passage defined between lower portions of said stationary shaft and said rotary sleeve and in communication with said hydraulic bearing means; and
 (f) a magnetic sealing means disposed within said lower housing at the lower end of said lubricant passage.

2. A rotary head assembly as defined in claim 1 wherein said magnetic sealing means includes one or more magnets which are in the form of a ring.

3. A rotary head assembly as defined in claim 2 wherein said one or more magnets are mounted on said rotary sleeve.

4. A rotary head assembly as defined in claim 2 wherein said one or more magnets are mounted on said lower housing.

5. A rotary head assembly as defined in claim 2, wherein said one or more magnets are mounted on said rotary sleeve.

6. A rotary head assembly as defined in claim 1 wherein said lubricant consists of a magnetic liquid.

7. A rotary head assembly as defined in claim 1 wherein said magnetic sealing means includes one or more magnets and one or more yokes, whereby a magnetic circuit is established through said one or more magnets, said one or more yokes, said rotary sleeve and said stationary shaft.

8. A rotary head assembly as defined in claim 1 wherein
 said magnetic sealing means includes one or more magnets, a liquid tank, and a magnetic liquid contained in said liquid tank;
 said rotary sleeve has its lower end positioned within said magnetic liquid; and
 said one or more magnets are so disposed as to surround the open end of said lubricant passage.

9. A rotary head assembly as defined in claim 8 wherein said liquid tank is formed in a magnetic body; and
 a magnetic circuit is established through said liquid tank, said rotary sleeve, said stationary shaft and said one or more magnets.

10. The rotary head assembly according to claim 1, further comprising a pair of adjacent rotary transformers for transmitting the signal derived by said magnetic heads, one rotary transformer being mounted on the upper cylinder, and the other rotary transformer being mounted on the lower cylinder, a motor disposed below said other rotary transformer and having an armature secured to said rotary sleeve for spinning the upper cylinder, the upper end of said rotary sleeve being closed and the lower end thereof being open at a position below the position at which the armature of said motor is mounted on the rotary sleeve, said armature being mounted at a position below said other rotary transformer.

11. A rotary head assembly having a main body, comprising:
   an elongated stationary shaft having one end thereof securely joined to the main body of said assembly;
   a rotary sleeve surrounding and disposed for rotation about the longitudinal axis of said stationary shaft, said sleeve having an upper end adjacent the free end of said shaft and a lower end adjacent said main body;
   an upper cylinder mounted on said rotary sleeve around the periphery thereof and carrying one or more video signal recording and reproducing heads;
   a hydraulic bearing means defined by portions of the boundary between said stationary shaft and said rotary sleeve adjacent said free end of said shaft, and a magnetic lubricant filling the space therebetween;
   a lubricant passage defined between adjacent portions of said stationary shaft and the lower end of said rotary sleeve, said passage being in communication with said hydraulic bearing means; and
   a magnetic sealing means being disposed at the lower end of and in communication with said lubricant passage, said magnetic sealing means comprising (i) an annular trough disposed in said main body surrounding said shaft adjacent said one end thereof, said trough comprising at least a part of said passage, (ii) at least one stationary magnet adjacent the outer perimeter of said trough for providing a generally radial magnetic field in said trough, (iii) a cylindrical ring affixed to said rotary sleeve adjacent the lower end thereof and having a downwardly extending magnetically permeable annular flange disposed within said trough and forming a lubricant passage portion of U-shaped cross-section therein, and (iv) magnetically permeable means adjacent said trough for providing a magnetic circuit path including said magnet and flange and traversing said U-shaped lubricant passage portion.

* * * * *